H. J. DAVISON.

WINDOW.

APPLICATION FILED APR. 8, 1910.

Reissued Oct. 25, 1910.

13,160.

4 SHEETS—SHEET 1.

Witnesses

C. H. Walker.

Grace P. Bureton

Inventor

Henry J. Davison

By Shurtleff & Mason

Attorneys

H. J. DAVISON.

WINDOW.

APPLICATION FILED APR. 8, 1910.

Reissued Oct. 25, 1910.

13,160.

4 SHEETS—SHEET 2.

Witnesses

C. M. Walker.

Grace P. Brereton

Inventor

H. J. Davison

By Shurtleff & Mason

Attorneys

H. J. DAVISON.

WINDOW.

APPLICATION FILED APR. 8, 1910.

Reissued Oct. 25, 1910.

13,160.

4 SHEETS—SHEET 3.

Witnesses

C. H. Walker.

Grace P. Brereton

Inventor

Henry J. Davison

By Shurtleff & Mason

Attorneys

H. J. DAVISON.

WINDOW.

APPLICATION FILED APR. 8, 1910.

Reissued Oct. 25, 1910.

13,160.

4 SHEETS—SHEET 4.

Witnesses
C. H. Walker
Grace P. Brereton

Inventor
Henry J. Davison
By Sturtevant & Mason
Attorneys

UNITED STATES PATENT OFFICE.

HENRY JOCELYN DAVISON, OF BEXHILL, ENGLAND, ASSIGNOR TO JAMES AUGUSTINE DAVIS, OF SAN FRANCISCO, CALIFORNIA.

WINDOW.

13,160. Specification of Reissued Letters Patent. Reissued Oct. 25, 1910.

Original No. 883,177, dated March 31, 1908, Serial No. 390,183. Application for reissue filed April 8, 1910. Serial No. 554,291.

*To all whom it may concern:*

Be it known that I, HENRY J. DAVISON, post-captain in His Majesty's royal navy, a subject of the King of Great Britain, residing at Moorfield, Sutherland avenue, Bexhill, in the county of Sussex, England, have invented new and useful Improvements Relating to Windows, of which the following is a specification.

This invention relates to windows of the type in which two sashes are hinged together and inserted in a single frame. Obviously in such windows the hinge line may be either vertical or horizontal, the pins which guide the sash being placed either in slots at the top and bottom or in slots on the two sides respectively.

The invention consists in an improved method of locking such a window in any desired position, and is, of course, equally applicable to windows of both types. As, however, the window having a vertical hinge possesses many advantages over the other form, the invention will be described as applied to this type.

The invention is illustrated in the accompanying drawings, in which—

Figure 1:
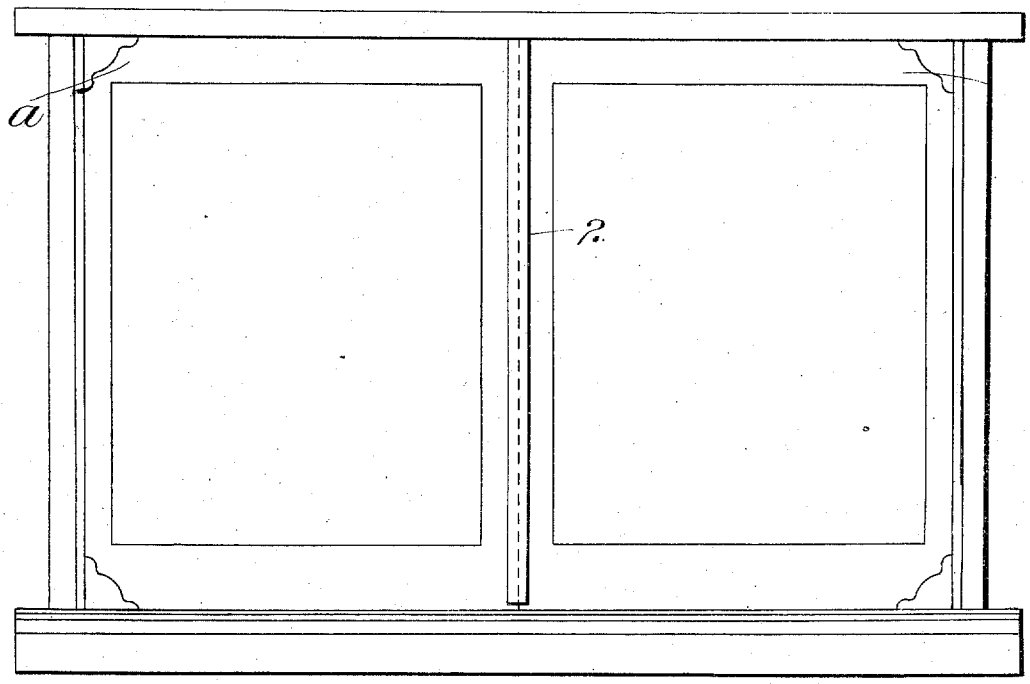
Figure 2:
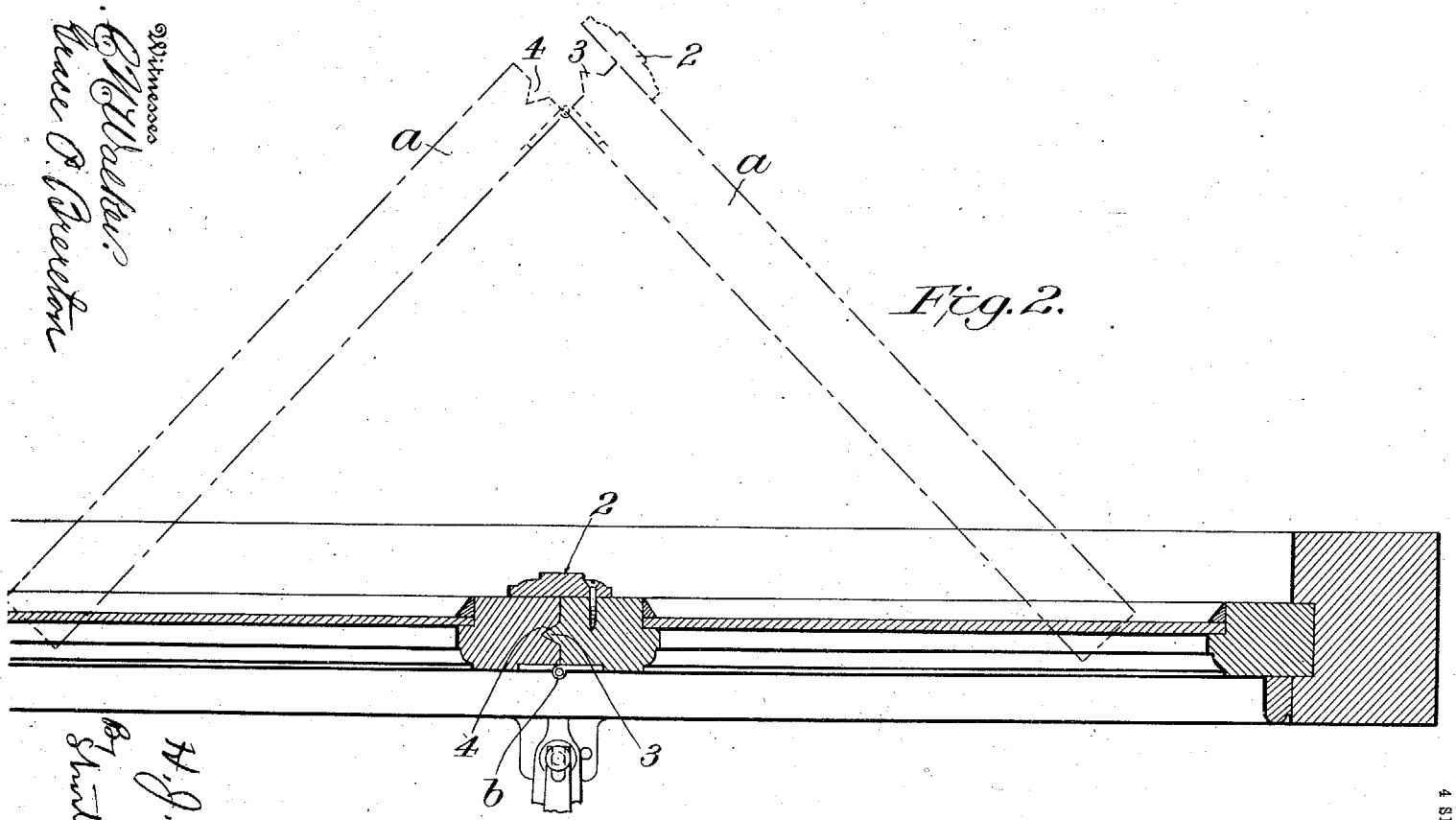
Figure 3:
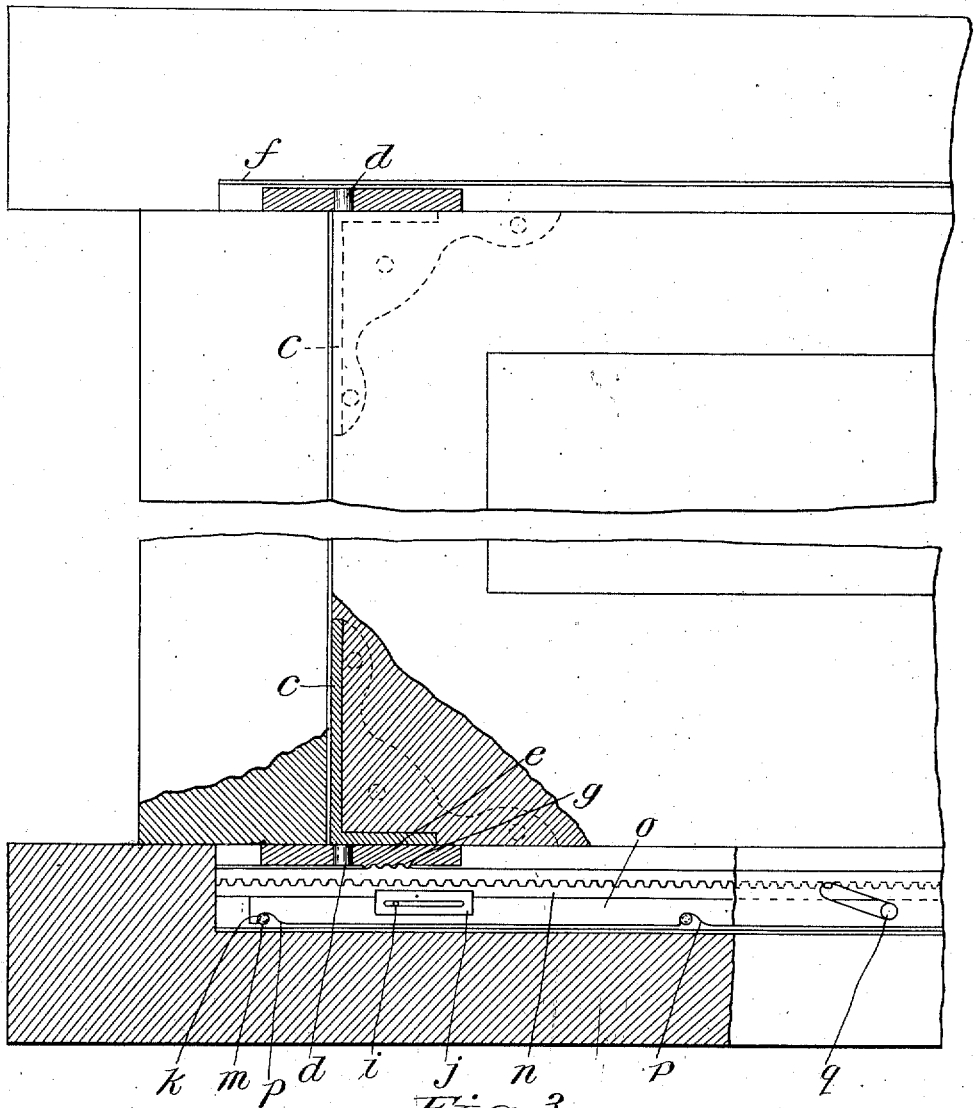
Figure 4:
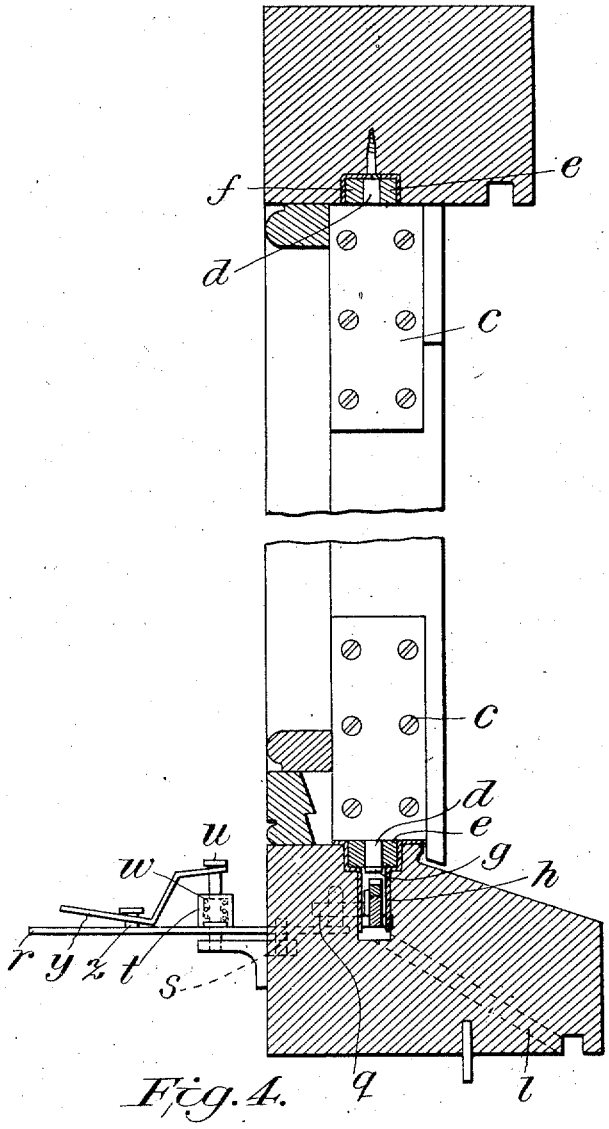
Figure 5:
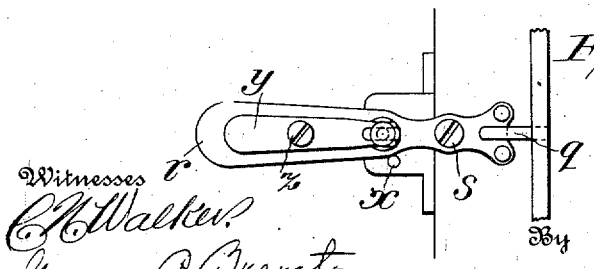

Figure 1 shows an elevation of the window in its closed position, as seen from the outside; Fig. 2 is a sectional plan of the same, indicating also in dotted lines the open position of the window; Fig. 3 is an enlarged detail view showing parts of the end of one of the windows in section to illustrate the locking mechanism; Fig. 4 shows the same parts in section in a plane at right angles to that of Fig. 3; and Fig. 5 is a detail view showing the locking lever of the window.

As will be readily seen from Fig. 1, the window consists of two main sash frames *a*, *a*, which are united by hinges in a vertical line at *b*. When in the open position, as shown by dotted lines in Fig. 2, the vertical line *b* lies some distance from the plane of the sashes, while the two remote ends of the two frames approach closer together. Each of the frames carries at the top and bottom on its outer end corner plates *c* secured to the frames by screws or the like, and bearing cylindrical bosses which are produced to form pins *d*. These pins are inserted in corresponding holes in small-plates of metal *e*, which differ in the top and bottom of the window. Those at the top of the window are simply short bars adapted to slide within the smooth channel bar *f*. Those at the bottom have formed on their under surface racks *g* which do not, however, extend throughout the whole breadth of the slip. The smooth edges of the slip rest upon two angle bars *h* at the bottom of the window. These bars are joined at intervals at the bottom by rivets *k* surrounded by sleeves or rollers *m*.

In order to lock the window, a rack bar *n* is arranged beneath it, and this when raised is adapted to mesh with the two racks *g* and so retain them in any position in which they may be found. The bar *n* may be raised in various ways. In the device illustrated, it has beneath it a second smooth bar *o*, which rests between the lowest vertical portions of the angle bars *h*. The bar *n* is further connected to the bar *o* by the slotted projections *j* upon it, engaging over pins *i* on the bar *o* so that the rack bar is moved down, as well as up, positively. On the underside of this bar are a number of notches *p*, arranged at the positions of the rivets *k*, and these notches have one side sloped so as to form an inclined plane which can ride up the rollers *m*. At the center of the bar *o*, or in any other suitable position, there is provided a projecting stud *q*, the end of which protrudes from the framing of the window through a slanting slot in the angle-bar *h*, and lies between the vertical ends of a forked lever *r* pivoted at *s*. This lever carries a hollow boss *t* in which is mounted a pin *u*, pressed downward by a spring *w*. In one position of the lever *r* the pin *u* is forced into a hole *x* in the plate on which the lever is mounted and so locks the lever in position. A bent strip *y* secured loosely on the pin *z* serves to raise the locking pin.

The action of the apparatus will be understood at once. When the lever *r* is moved, say to the right, the stud *q* is pushed to the left, and carries with it the whole bar *o*. The sloping surfaces of the notches *p* riding up the rollers *m* raise the bar *o*, and with it the rack bar *n*, the stud *q* moving along the sloping slot in the angle-bar *h*. Finally, the rack bar *n* is brought into engagement with the racks *q* on the slips of metal *e*, so locking the window, while the pin $u$ drops into the hole $x$ and retains the lever $r$ in the locking position. The fact that the rack bar $n$ is separate from the bar $o$ permits the former to have a slight lateral movement, so that in case its teeth should be lying directly beneath those of the racks $g$, it can be shifted sufficiently to bring the teeth into mesh. To assist in this action also, the teeth may be formed with suitably rounded tops. As mentioned above, the angle bars $h$ are not united at the bottom save by the rivets $k$, and preferably the slot in the wood framing in which they are placed is a little deeper than the angle bars, and has its lowest surface sloped to one side, with a channel $l$ leading from the slot to the under side of the sill or other convenient position. In this way, any water which may enter the slot is drained off without inconvenience.

Obviously many details of the device are open to variation. For example, various means may be provided for making a tight joint in front of the hinges at 5. In the form shown in Fig. 2, there is simply a projecting bead 2 on the one frame $a$, which in the closed position overlaps the edge of the other frame, while a tongue 3 is adapted to enter the rabbet 4. Devices such as this will be obvious to those acquainted with the art, and as they form no part of the invention, need not be further described or illustrated. In a similar way alterations may be made in the manner of raising the rack bar $n$. For example, an obvious alternative is to provide pins on the bar $o$ and sloping slots in the channel bars $h$. These will effect exactly the same purpose and effect it in the same manner. Another alternative is to use eccentrics beneath the bar $o$ rotated by projecting shafts, but in this case it is difficult to get the required leverage, and to operate the window from one handle. Many such devices as these are known to be mechanical equivalents, and it is not necessary, therefore, to outline them all in this place. It is possible also to actually do without the teeth upon the bar $n$ and the metal slips $e$. These teeth, it will have been seen, provide a positive means for preventing relative movement between the window and its guides, but it will generally be sufficient to secure the window by frictional engagement between two surfaces, and in this case smooth or slightly roughened bars will be all that is required in place of the rack bar $n$ and the slips $e$. If desired, also, the bar $n$ may be normally pressed up by springs, and may be forced down to release the window in some one of the ways suggested above for raising it. Obviously also it may in some cases be possible to do without the forked lever $r$, since this only serves to reduce the force required to move the stud $q$. Such variations or omissions as these do not affect the working of the invention, and are, therefore, to be considered within the scope of the application.

Having thus described my invention, what I claim as new and desire to secure by Letters Patent, is:—

1. In a window, the combination of two sashes and means hinging them together, a window frame with guiding grooves at the top and bottom thereof, sliding pieces pivotally attached to the sashes near their free ends and working in the grooves, and a bar in the groove at the bottom of the frame adapted to be raised into locking engagement with the lower sliding members or to be lowered away from said members to leave them free for movement in the adjustment of the window.

2. In a window, the combination of two sashes and means hinging them together, a window frame with guiding grooves at the top and bottom thereof, sliding pieces pivotally attached to the sashes near their free ends and working in the grooves, rack teeth on the lower sliding member of each sash, and a locking rack in the window frame with means for raising it into locking engagement with the sliding members and for lowering it out of engagement with said members.

3. In a window, the combination of two sashes and means hinging them together, a window frame with guiding grooves at the top and bottom thereof, sliding pieces pivotally attached to the sashes near their free ends and working in the grooves, rack teeth on the lower sliding member of each sash, a locking rack mounted in the lower groove beneath the sliding members, said rack being free to make a small longitudinal motion, a set of stationary cross pins over which inclined surfaces on the rack bar are adapted to work, and means for pushing the bar longitudinally, whereby it is caused to slide up over the cross pins and to come into engagement with the teeth on the sliding members.

4. In a window, the combination of two sashes and means hinging them together, a window frame with guiding grooves at the top and bottom thereof, sliding pieces pivotally attached to the sashes near their free ends and working in the grooves, rack teeth on the lower sliding member of each sash, a rack bar mounted with freedom for a small longitudinal movement in the lower groove of the window frame, means adapted to cause said bar to rise when moved longitudinally in one direction and to fall when moved in the other direction, a lever and means for supporting it upon the window frame and connecting means between the lever and the rack bar.

5. In a window, the combination of two sashes, and means hinging them together, a window frame, sliding members at the top and bottom of said frame, means for movably guiding said sliding members in a direction transversely to said frame, means for connecting said sashes near their free ends to said sliding members, whereby said sashes may be swung on their hinged connection to a position at an angle to each other, a locking bar extending transversely across said frame and adapted to be moved into engagement with said sliding members at one end of said frame in all of the adjustments of said sliding members, and means for moving said bar to lock and release said sashes.

6. In a window, the combination of two sashes and means hinging them together, a window frame, sliding members at the top and bottom of said frame, means movably guiding said sliding members in a direction transversely to said frame, means for connecting said sashes near their free ends to said sliding members, whereby said sashes may be swung on their hinged connections to a position at an angle to each other, said sliding members at the bottom of the frame having projecting teeth, a toothed locking bar adapted to coöperate with the teeth on said sliding member to lock the sashes in adjusted positions, and means for moving said locking bar to lock or release said sashes.

HENRY JOCELYN DAVISON.

Witnesses:
A. E. O'Dell,
Leonard E. Haynes.